C. DONOVAN.
Sewing Machine.
No. 20,994.
Patented July 27, 1858.
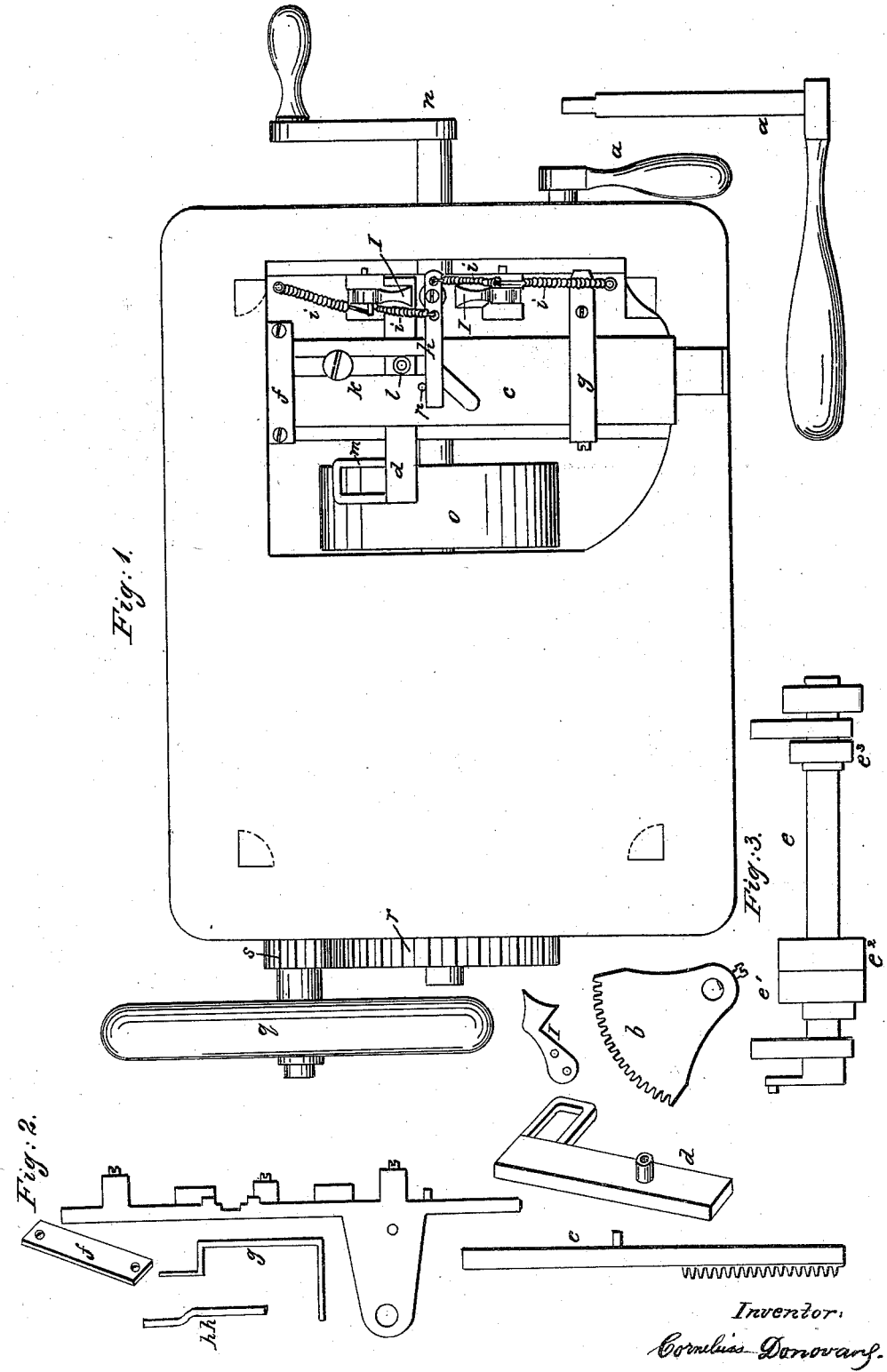
Inventor:
Cornelius Donovan.

UNITED STATES PATENT OFFICE.

CORNELIUS DONOVAN, OF ABINGTON, MASSACHUSETTS.

IMPROVEMENT IN SEWING-MACHINES.

Specification forming part of Letters Patent No. 20,994, dated July 27, 1858.

*To all whom it may concern:*

Be it known that I, CORNELIUS DONOVAN, of Abington, in the county of Plymouth, State of Massachusetts, have invented a new and useful improvement on Singer's patent sewing-machine for stopping the same while the power continues in motion; and I do hereby declare that the following is a full, clear, and exact description of the same, reference being had to the annexed drawings, making a part of this specification.

$a$ is a lever standing nearly perpendicular and working a shaft under the bed of the machine, to which is attached a segment of a cog-wheel, $b$. $b$ works in a sliding rack, $c$, which it moves backward and forward as the lever is moved.

$k$ is a cam or opening in the sliding rack $c$, which, as it moves back and forth, works on the friction-roller $l$ and moves a slide, $d$, to the right and left, and by means of a guide, $m$, on its end moves a belt, which passes through it from a tight to a loose pulley, $e'$ $e^2$, in Fig. 3, situated directly over pulley $o$ on shaft $e$. This belt runs on a pulley which is fixed on the power-shaft $n$, and passes from this pulley over the tight and loose pulleys $e'$ $e^2$ in Fig. 3, and so communicates or suspends motion to the sewing-machine.

$h$ is a lever, fixed at one end so as to turn on a screw, and the other end moves against a pin, $p$, which is fixed to the sliding rack $c$.

To the lever $h$ is fastened the springs $i\ i\ i\ i$, whose use is to carry backward and forward two brakes, $j\ j$, one against each side of the fixed pulley $e^3$ on shaft $e$, by the operation of the lever $h$.

$q$ is a balance-wheel connected with the power-shaft $n$ by the wheels $r$ and $s$.

Figure 3 is a shaft moved by a belt from the wheel $o$ to the fixed pulley $e'$, by the side of which is the loose pulley $e^2$, running on the shaft.

$e^3$ is a fixed pulley, to which the brakes $j\ j$ are applied when desired.

Fig. 2 is a longitudinal section of the bed, in which the sliding rack $c$ moves.

$j'$ is a longitudinal section of the brakes $j\ j$.

$f$ and $g$ are straps to hold the sliding rack $c$ in its place.

$h\ h$ is a longitudinal section of the lever $h$.

$d\ d$ is a slide moved by the cam $k$.

When the sewing-machine is in motion and the lever $a$ stands pushed back from the operator, the belt around the wheel $o$ runs around the tight pulley $e'$ and carries the machine.

To stop the machine without stopping the power, the operator pulls the lever $a$ forward, when the cam $k$ moves the slide $a$ and the guide $m$ to the right, carrying with it the belt onto the loose pulley $e^2$, Fig. 3. At the same time the pin on the sliding rack $c$ moves the lever $h$ forward, which carries the brakes $j\ j$ against the fixed pulley $e^3$ of shaft $e$, and instantly stops the machine while the power continues in motion.

What I claim as my invention, and desire to secure by Letters Patent, is—

The application or attachment to the sewing-machine of the stop-motion herein described, consisting of the lever $a$, the cog-gear segment $b$, the rack $c$, the belt-guide $d$, the brakes $j\ j$, the crank $n$, the springs $i\ i\ i\ i$, and the lever $h$, the cam $k$, the pulleys $e'$ $e^2$, and the belt running on them, the pulley $e^3$, arranged and operating in the manner described.

CORNELIUS DONOVAN.

Witnesses:
  D. U. JOHNSON,
  S. A. ELDRIDGE.